(12) United States Patent
Gimpel et al.

(10) Patent No.: US 11,579,269 B2
(45) Date of Patent: Feb. 14, 2023

(54) DETERMINING THE DISTANCE OF AN OBJECT

(71) Applicant: SICK AG, Waldkirch (DE)

(72) Inventors: Hartmut Gimpel, Constance (DE); Matthias Honal, Waldkirch (DE)

(73) Assignee: SICK AG, Waldkirch (DE)

( * ) Notice: Subject to any disclaimer, the term of this patent is extended or adjusted under 35 U.S.C. 154(b) by 260 days.

(21) Appl. No.: 16/868,322

(22) Filed: May 6, 2020

(65) Prior Publication Data
US 2020/0355809 A1 Nov. 12, 2020

(30) Foreign Application Priority Data
May 10, 2019 (DE) .......................... 102019112300.3

(51) Int. Cl.
*G01S 7/4913* (2020.01)
*G01S 17/32* (2020.01)
*G01S 17/36* (2006.01)

(52) U.S. Cl.
CPC ............ *G01S 7/4913* (2013.01); *G01S 17/32* (2013.01); *G01S 17/36* (2013.01)

(58) Field of Classification Search
CPC ......... G01S 7/4913; G01S 17/32; G01S 17/36
USPC ...................................................... 356/5.11
See application file for complete search history.

(56) References Cited

U.S. PATENT DOCUMENTS

| 5,216,236 | A | 6/1993 | Blais | |
|---|---|---|---|---|
| 2007/0103699 | A1* | 5/2007 | Kohnen | G01S 17/42 356/620 |
| 2017/0219706 | A1* | 8/2017 | Baldischweiler | G01S 7/4972 |
| 2018/0032211 | A1* | 2/2018 | King | G06F 1/3231 |
| 2018/0210070 | A1* | 7/2018 | Bleyer | G01S 7/497 |
| 2018/0278456 | A1* | 9/2018 | Sternklar | H04L 27/361 |

(Continued)

FOREIGN PATENT DOCUMENTS

| DE | 19757849 B4 | 12/2004 |
|---|---|---|
| DE | 102013207651 A1 | 11/2013 |

(Continued)

OTHER PUBLICATIONS

German Search Report dated Dec. 9, 2019 corresponding to application No. 102019112300.3.

*Primary Examiner* — Leila Malek
(74) *Attorney, Agent, or Firm* — Nath, Goldberg & Meyer; Jerald L. Meyer; Stanley N. Protigal

(57) ABSTRACT

An optoelectronic sensor for determining the distance of an object in a monitoring area has a light transmitter for transmitting transmitted light, a light receiver for generating a received signal from remitted light remitted by the object, and a control and evaluation unit configured to modulate the transmitted light with at least a first frequency and a second frequency, to determine a phase offset between transmitted light and remitted light for the first frequency and the second frequency, and to determine a light time of flight. The control and evaluation unit is configured to determine a first amplitude and a second amplitude for the first frequency and the second frequency from the received signal and to detect whether the transmitted light impinges on an edge in the monitoring area on the basis of an evaluation of the first amplitude and the second amplitude.

12 Claims, 3 Drawing Sheets

(56) References Cited

U.S. PATENT DOCUMENTS

2018/0284268 A1 10/2018 McWhirter
2019/0246963 A1* 8/2019 Chung .................. G16H 10/65

FOREIGN PATENT DOCUMENTS

EP 2395368 A1 12/2011
EP 2801786 A1 11/2014

* cited by examiner $f_0$ $f_1$

DETERMINING THE DISTANCE OF AN OBJECT

FIELD

The invention relates to an optoelectronic sensor and a method for determining the distance of an object in a monitoring area.

BACKGROUND

Many optoelectronic sensors operate with a scanning principle, where a light beam is transmitted into a monitoring area, and the remitted light beam that is returned by objects is received in order to electronically evaluate the received signal. The light time of flight often is measured in order to determine the distance of a scanned object. This type of distance measurement is also known as ToF (Time of Flight) or LIDAR (Light Detection and Ranging).

The scanning beam can be moved to extend the measurement field of view, as in a laser scanner. There, a light beam generated by a laser periodically sweeps over the monitoring area with the aid of a deflection unit. In addition to the measured distance information, the angular position of the deflection unit is used to determine the angular position of the object, and thus the location of an object in the monitoring area is detected in two-dimensional polar coordinates. In most laser scanners, the scanning movement is achieved by a rotating mirror. However, it is also known to rotate the entire measuring head with light transmitters and light receivers, as described for example in DE 197 57 849 B4.

In time-of-flight measurement, a distinction is made between pulse-based and phase-based methods. In a pulse method, the time-of-flight of a light pulse or a sequence of light pulses is measured directly, which is why this method is also known as dToF (direct ToF). However, for high-precision measurements, especially in a laser scanner, as required for example in the field of volume measurement, pulse-based methods are less suitable under given conditions with regard to costs, laser power, available components and the like.

For this reason, the phase method will be considered in more detail in the following. In a phase method, also known as CW measurement method or iToF (indirect ToF), the transmitted light is periodically modulated, typically with a modulation frequency in the order of 100 MHz. The phase shift of the modulation between transmitted light and received light, after multiplication with the known modulation wavelength, is the light time of flight to be measured. However, the phase method has only a very small unambiguity range corresponding to half a modulation wavelength, which for example means only 1.5 m at 100 MHz.

In order to deal with this problem, it is known that the CW measurement is carried out with several modulation frequencies, which are modulated onto the measuring light one after the other in separate measurement cycles, or sometimes also simultaneously. The phase offset is determined for each modulation frequency, and thus a distance value in an enlarged unambiguity range is calculated. For the special case of two modulation frequencies $f_0$, $f_1$, the enlarged unambiguity range corresponds to that of a synthetic difference frequency $f_0$-$f_1$.

A measurement situation that leads to considerable errors in time-of-flight measurements is when the transmitted light impinges on an edge in the monitoring area. An edge means that the light spot of the transmitted light beam impinges on an object surface with a partial cross-section only, while the remaining light passes this object surface and impinges on another object surface that is possibly much farther away. The received signal then corresponds to a mixture of two different distance measurements.

With a pulse method, the partial reflections at the two object surfaces at different distances from one another result, in the best case, in distinguishable echoes in the received signal. In that case, the edge can be detected, or a multi-echo evaluation with distance values to both object surfaces is possible. However, if the distance between the two object surfaces is relatively small, the echoes already merge so that separation is no longer possible.

Regardless of how well a pulse method might be able to detect and evaluate edges, the differentiation of several echoes cannot be transferred to a phase method. Thus, it has not yet been possible to take advantage of the higher accuracy of the phase method without also accepting the usually erroneous measured values at edges.

SUMMARY

It is therefore an object of the invention to improve the time-of-flight measurement with a phase method.

This object is satisfied by an optoelectronic sensor for determining the distance of an object in a monitoring area, the sensor having a light transmitter for transmitting transmitted light, a light receiver for generating a received signal from remitted light remitted by the object, and a control and evaluation unit configured to modulate the transmitted light with at least a first frequency and a second frequency, to determine a phase offset between transmitted light and remitted light for the first frequency and the second frequency, and to determine a light time of flight from that, wherein the control and evaluation unit is furthermore configured to determine a first amplitude and a second amplitude for the first frequency and the second frequency from the received signal and to detect whether the transmitted light impinges on an edge in the monitoring area on the basis of an evaluation of the first amplitude and the second amplitude.

The object is also satisfied by a method for determining the distance of an object in a monitoring area, wherein transmitted light modulated with at least a first frequency and a second frequency is transmitted into the monitoring area, a received signal is generated from remitted light remitted by the object, a respective phase offset between transmitted light and remitted light is determined for the first frequency and the second frequency, and a light time of flight is determined from that, wherein a first amplitude and a second amplitude for the first frequency and the second frequency are determined from the received signal, and it is detected whether the transmitted light impinges on an edge in the monitoring area on the basis of an evaluation of the first amplitude and the second amplitude.

In the sensor, a light transmitter generates transmitted light modulated with at least a first frequency and a second frequency. The modulation with different frequencies is possible both one after the other in different measuring cycles or simultaneously. The transmitted light is received as remitted light after it has been at least partially reflected or remitted by an object in the monitoring area. Using the corresponding received signal of a light receiver, a control and evaluation unit determines the phase offset for the respective frequency. From the phase offsets determined two—or manifold in this way, a light time of flight in an enlarged unambiguity range is calculated in accordance with the phase method with several frequencies discussed in the introduction, which time of flight can be converted into a distance to the scanned object.

The invention starts from the basic idea of using not only the phase but also the amplitude for the respective modulation frequencies to detect edges. For this purpose, the amplitude for the respective modulation frequencies is also determined from the received signal. In the case that transmitted light impinges on an edge in the monitoring area, the amplitudes deviate from one another, as will be explained later. An edge can therefore be assumed if the differences in amplitude are more than expected due to noise. As already defined in the introduction, an edge means that the transmitted light impinges on object surfaces at different distances with respective partial cross-sections, in particular in sudden jumps and at clearly different distances. Thus, the light time of flight ultimately is measured as an indeterminate mixed value at an edge, and this case is detected according to the invention. Mind that an edge measurement according to the invention means that the respective measurement point is inaccurate or cannot be obtained in the first place, which should not be confused with conventional edge detection algorithms that only start after the generation of that point cloud.

The invention has the advantage that when the transmitted light impinges on an edge, which otherwise would result in incorrect distance measurement values, this can be detected and thus be treated separately, or the measurement can be discarded. The measured distances are therefore more accurate and contain fewer systematic measuring errors. Accordingly, the position and dimensions of the measured objects are also determined with more accuracy, for example when measuring the volume of objects. In particular, object edges are located more precisely, which often even represent particularly important measurement information. The occurrence of incorrect measurements is reduced. Without the detection of edges, it is conventionally necessary to filter the measured values, which in turn generates measurement artifacts. According to the invention, such filtering is no longer necessary because the edges have already been detected. This avoids the measurement artifacts mentioned above and simplifies downstream data processing, because the raw measurement data already have a higher reliability. The above-mentioned aspects are particularly relevant when measuring small objects, since filtering is often not possible at all due to the smaller number of measuring points on a small object. Accordingly, the error in edge or object size determination is particularly high if there is an edge in a small number of object points, and this error is avoided according to the invention because the edge is identified as being an edge.

The control and evaluation unit preferably is configured to evaluate at least one of a difference of the first amplitude and the second amplitude with a tolerance threshold and the ratio of the first amplitude and the second amplitude. The tolerance threshold is preferably selected on the basis of the expected or measured noise level, so that it can be used to distinguish between differences of the amplitudes caused by noise and those caused by edges. An evaluation of the ratio of the two amplitudes has the advantage of independence from the absolute values of the amplitudes, since they are included in both the numerator and denominator. Throughout this specification, the terms preferably or preferred relate to advantageous, but completely optional features.

The control and evaluation unit preferably is configured to evaluate a quotient of standard deviation and mean value of the amplitudes. This is another possible criterion for detecting differences in amplitudes that are noise-related or systematic due to edges. This criterion has the further advantage that it can be easily generalized to more than two frequencies.

The control and evaluation unit preferably is configured to determine a significance value for the detection of whether the transmitted light impinges on an edge in the monitoring area. In these preferred embodiments, there is not only a digital decision whether there is an edge, but a significance evaluation is also carried out in order to determine the reliability of this decision. For example, the difference between the amplitudes, the deviation of the ratio of the amplitudes from the value one, or some other measure function is used, which may be based on moments of a distribution such as mean or standard deviation. The absolute amplitude can be used as a further criterion for significance evaluation, because if it is small, differences due to noise are all the more pronounced. Thus, if the absolute amplitude is small, apparent edges are more likely to occur where actually the differences are only noise-related.

The control and evaluation unit preferably is configured to discard distance values where the transmitted light impinges on an edge in the monitoring area, or to output these distance values with additional information. If measurements at edges are discarded, the quality of the remaining measured values is significantly increased. On the other hand, the measurement information still present in the edge measurements would be lost. For this reason, additional information can also be added to the distance values from edge measurements so that a subsequent evaluation may decide how to deal with edge measurements.

The additional information preferably is a binary edge marker or flag, or a significance value. Using a binary marker, the subsequent evaluation can always subject edge measurements to special treatment, for example, discard them, display them or consider them with a lower weight. In addition, knowledge of edge measurements "at the origin" facilitates or replaces downstream edge detection in the measurement data or point cloud. The binary marking can be encoded in the output measured value to simplify data output, for example as the most significant or least significant bit in the measured value. A significance value on the other hand can for example be evaluated downstream via a threshold or used as a weight for statistical evaluations.

The control and evaluation unit preferably is configured to determine phase offsets and amplitudes by-in-phase and quadrature (IQ) demodulation. The received signal is mixed with a signal of the first frequency or the second frequency, as well as with a signal of the respective frequency phase-shifted by 90°. This is a robust way of recovering the information in the respective frequencies at the receiving end. Alternatives are also conceivable, such as pixels with several charge storages or taps that are active at certain phases of the respective frequency, or an adapted Fourier analysis.

The control and evaluation unit preferably is configured to modulate with an artificial first frequency and second frequency independent of the carrier frequency of the transmitted light. In this embodiment, measurements are carried out using a conventional phase or CW method. The two frequencies are artificial modulation frequencies which are independent of the carrier frequency of the light and many orders of magnitude smaller. In other embodiments, it is conceivable that the modulation in the first frequency and the second frequency are carried out in the light frequency itself, so that a light transmitter with a variable wavelength or several light sources of different wavelengths are required. Such a coherent measurement method has a much smaller inherent unambiguity range, which can be extended by various approaches such as the use of several frequencies, and in return a much greater measurement accuracy in the micrometer range and better.

The sensor preferably is configured as a laser scanner having a movable deflection unit for periodically scanning the monitoring area with the transmitted light and an angle detection unit for determining the respective angular position of the deflection unit. Various designs with rotating mirror, rotating measuring head wherein the light transmitter and/or light receiver rotate, and also multi-beam systems are conceivable. In the course of the scanning movement, transmitted light impinging on edges almost inevitably occurs when the scanning beam moves in the scanning direction and onto an object for the first time, or from one object to the next. It is therefore particularly advantageous if edges are detected and dealt with appropriately.

The control and evaluation unit preferably is configured to locate an object in the monitoring area by means of a detected edge. Measurements from transmitted light impinging on edges are thus not merely considered as inferior measured values with unreliable distance values. Rather, the knowledge that the transmitted light has impinged on an edge in itself is used as valuable measurement information. Objects can thus be located and measured more precisely. This is particularly relevant in a laser scanner. In a laser scanner, objects are conventionally located by means of a discontinuity in the measured distances, and thus edges with their unreliable distance information blur the position of the object in the scanning direction. Sometimes the edge is detected as a discontinuity and sometimes not, so that the width of the objects in the scan direction is systematically over—or underestimated. However, according to the invention, the angular positions where edges are detected during the scan are known, and accordingly the localization becomes more precise.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
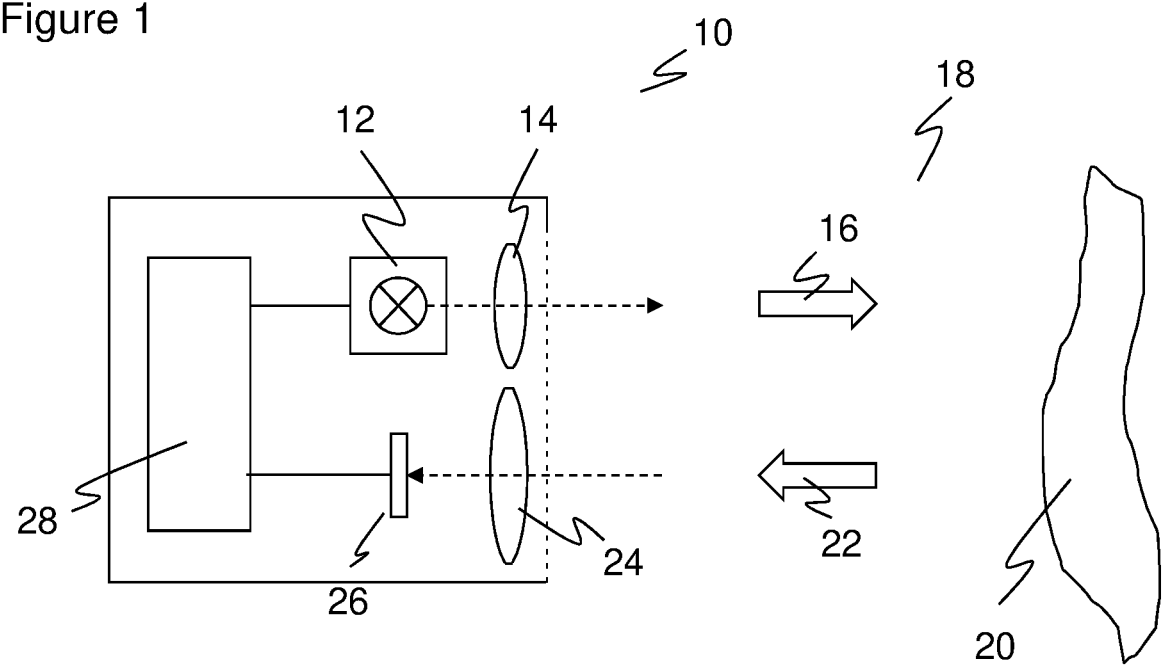
FIG. 1 a schematic diagram of an optoelectronic sensor.

FIG. 1 shows a schematic sectional view of an optoelectronic sensor 10. A light transmitter 12, for example a laser or LED, transmits transmitted light 16 into a monitoring area 18 via transmission optics 14. The light transmitter 12 preferably has a laser light source, in particular a semiconductor laser in the form of a VCSEL laser or edge emitter, but other light sources such as LEDs are also conceivable.

When the transmitted light 16 impinges on an object 20 in the monitoring area 18, part of the light returns to the sensor 10 as remitted light 22, where it is guided by receiving optics 24 onto a light receiver 26, for example a PIN diode, an APD (avalanche photodiode) or a single-photon APD (SPAD, avalanche photodiode in Geiger mode) or a multiple arrangement thereof.

A control and evaluation unit 28 controls the light transmitter 12 and evaluates the received signal of the light receiver 26. The light time of flight is measured using a phase method (CW method, iToF), wherein, in order to increase the unambiguity range, the transmitted light 16 is modulated with at least two frequencies $f_0$, $f_1$, and the phase offset of the received signal is determined in both frequencies. The modulation is preferably carried out with an artificial frequency, for example in the range between 0.3 and 300 MHz, wherein a sinusoidal, rectangular and in principle any other periodic modulation is conceivable.

According to the invention, not only the phase but also the amplitude of the received signal is determined for each of the modulation frequencies. Based on these amplitudes, the control and evaluation unit can detect 28 edges, i.e. where the light spot generated by the transmitted light 16 impinges on an edge in the monitoring area 18. This is explained in more detail below with reference to FIGS. 2 to 5.

The basic configuration of sensor 10 according to FIG. 1 is only exemplary. Other arrangements are conceivable, for example a coaxial instead of a biaxial configuration, and also sensor types other than a one-dimensional scanning sensor, in particular a laser scanner. In a laser scanner, the transmitted light 16 is periodically deflected as a scanning beam with the aid of a rotating mirror and thus scans a scanning plane in the monitoring area 18. Alternatively, a measuring head with light transmitter 12 and light receiver 26 rotates. The respective angular position of the rotating mirror or the measuring head is determined with an encoder or the like, so that from the angle and measured distance measuring points in polar coordinates result. Instead of the single beam of transmitted light 16 as shown, multi-beam systems are also possible. In the case of a laser scanner, several scanning planes are thus generated. It is also conceivable to configure the sensor 10 as a time-of-flight camera with a pixel matrix as light receiver 26, wherein the monitoring area 18 is illuminated in an entire area or pixel by pixel, using a large number of simultaneous light beams or one controlled light beam after the other.

Figure 2:
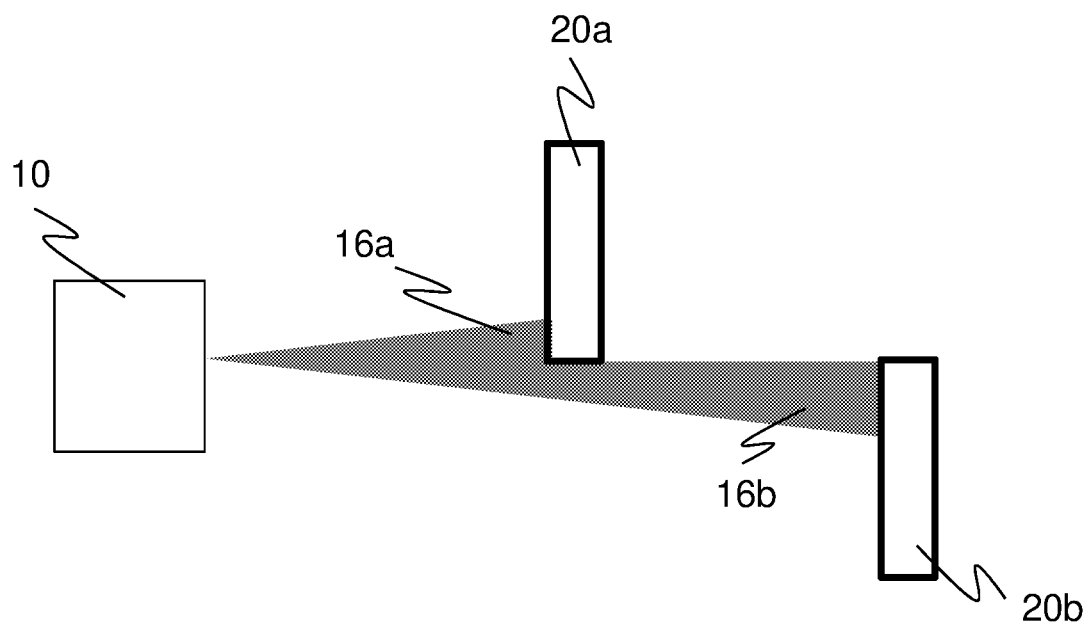
FIG. 2 a schematic representation of transmitted light of an optoelectronic sensor impinging on an edge.

FIG. 2 schematically illustrates an edge measurement where transmitted light impinges on an edge in the monitoring area 18. This means that the transmitted light 16 impinges on two object sections or objects 20a-b simultaneously during the same measurement, namely a closer object 20a and a farther object 20b. The transmitted light 16 is kind of divided, with one partial cross-section 16a impinging on the nearer object 20a and another partial cross-section 16b on the farther object 20b. Accordingly, the received signal is generated by a superposition of remitted light 22 from the closer object 20a and the farther object 20b. Such edge measurements regularly result in incorrect measurement values, which complicates subsequent data processing and affects the final measurement results. According to the invention, edge measurements should be detected in a phase method with several frequencies.

Figure 3A:
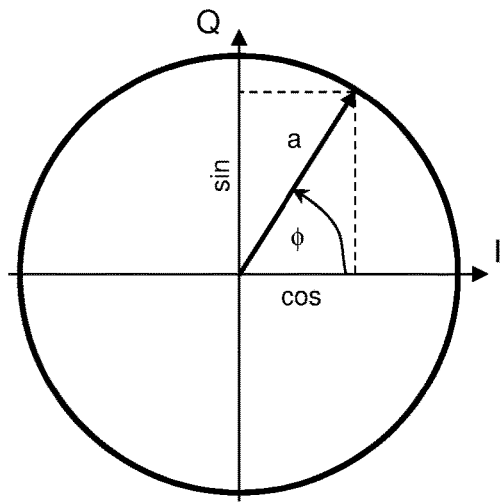
FIG. 3a a representation of a vector in the complex plane to explain the determination of phase and amplitude of a signal.

FIG. 3a shows the representation of a sinusoidal signal in a vector diagram in the complex plane in order to explain the general mathematical background. The two axes are labeled in accordance with an IQ modulation. A signal oscillating at a certain frequency $f_i$ can be characterized by its amplitude a and its phase $\phi$. The respective proportion $I_{fi}$ and $Q_{fi}$ in the two axes corresponds to a sin $\phi$ and a cos $\phi$.

To recover these values a, $\phi$ from the received signal per frequency $f_i$, an IQ method can be used. The received signal is mixed with the corresponding transmitted signal and a transmitted signal shifted by 90°, so that after subsequent lowpass filtering the quantities $I_{fi}$ and $Q_{fi}$ are detected. This allows the phases and amplitudes to be calculated as $$\phi_{fi} = \tan^{-1} \frac{Q_{fi}}{I_{fi}}$$

and $$a_{fi} = \sqrt{I_{fi}^2 + Q_{fi}^2}.$$

This determination of phase and amplitude is advantageous, but not the only possibility. For example, the phase and amplitude of the desired frequencies in the received signal can alternatively be calculated with a Fourier transformation after digitization. Furthermore, specific receiving pixels are conceivable, in which the generated photoelectrons are collected via multiple charge storages or taps depending on the current phase of the transmitted light.

Figure 3B:
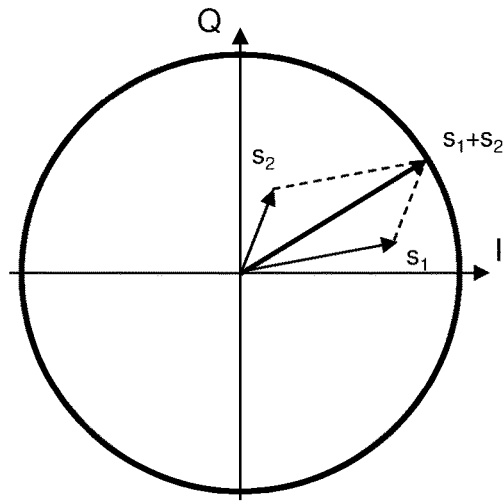
FIG. 3b a representation similar to FIG. 3a to explain the superimposition of two signals.

FIG. 3b shows, in a diagram corresponding to FIG. 3a, the superimposition of two signals $s_1$, $s_2$ of the same frequency $f_i$ but different phase and amplitude to form a sum signal $s_1+s_2$. From the sum signal $s_1+s_2$, the phase of the individual signals can no longer be easily reconstructed. If such a sum signal $s_1+s_2$ is interpreted as a simple sinusoidal signal, a single phase and a single amplitude can be determined, but these generally no longer correspond to the phase and amplitude of one of the two signals $s_1$, $s_2$.

Figure 4A:
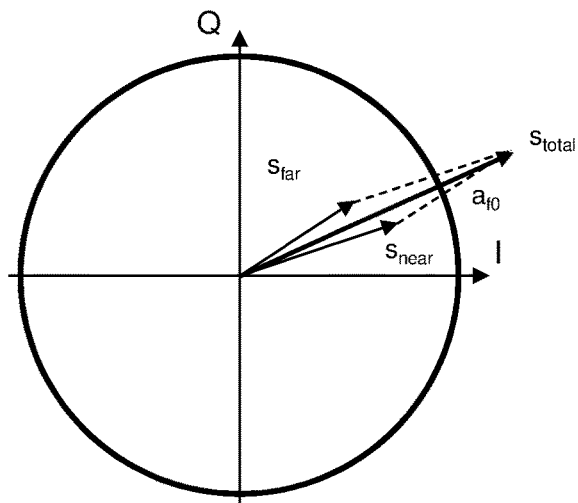
FIG. 4a-b a representation of the superimposition of the received signals in the case of an edge for two different frequencies $f_0$, $f_1$.
Figure 4B:
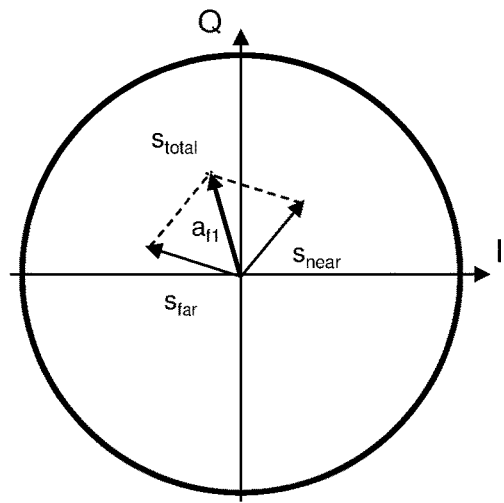

FIG. 4a-b shows the corresponding situation in the case of an edge measurement, causing a superimposition of two signals as described with reference to FIG. 3b. As shown in FIG. 2, one part 16a of the transmitted light propagates along a different path than the other part 16b. Accordingly, the received signal $s_{total}$ is a superposition of a signal $S_{near}$ and a signal $S_{far}$ wherein the phase is a mixture of $\phi_{near}$ and $\phi_{far}$. For each of the frequencies $f_0$ and $f_1$ involved, as shown in FIG. 4a and FIG. 4b, sum signals are generated that no longer enable to reconstruct the values $\phi_{near}$ and $\phi_{far}$.

However, in the measurements with the modulation frequencies $f_0$ and $f_1$, there are different phase differences $\phi_{near}$ and $\phi_{far}$. The fact that there is a different phase difference for the same distance at different measuring frequencies is exactly the reason why measurements with different frequencies are carried out and so that the unambiguity range can be extended. Thus, the vectors representing $s_{near}$ and $s_{far}$ in FIGS. 4a-b have different angles depending on the frequency $f_0$ and $f_1$. In particular, the difference in angle between the vectors for one frequency $f_0$ according to FIG. 4a is not the same as the difference in angle between the vectors for the other frequency $f_1$ according to FIG. 4b. In the vectorial addition, despite individual vectors $S_{near}$, $S_{far}$ of equal length, the resulting vectors $s_{total}$ have different lengths depending on the frequency $f_0$ and $f_1$.

As a result of this observation, it can be stated that in the case of an edge measurement, the modulation amplitudes of the received light are usually different for the two measuring frequencies $f_0$ and $f_1$. On the basis of this difference in amplitude, edge measurements can be detected. One advantage of this edge detection is that it also works in cases where a distance value that was incorrectly determined due to the edge does not form a clear outlier within a measurement contour. Such an outlier could also be detected by other means. A moderate measuring error, on the other hand, would remain undetected simply by looking at the distance, whereas the invention nevertheless detects the edge.

Accordingly, the control and evaluation unit 28 compares the amplitudes $a_{fi}$ with one another that are determined in addition to the phases for the respective frequency $f_i$ for a respective measured distance value. If there is a significant difference, it is an edge measurement. The extent of the difference also allows a statement about the reliability of the detection of the edge measurement.

Instead of directly comparing the amplitudes with one another, for example evaluating their difference with a tolerance threshold, their ratio $$v := \frac{a_{f0}}{a_{f1}}$$

can be considered. The more the amplitude ratio deviates from the value one, the higher the probability of an edge measurement. With the same amplitudes $a_{f0}=a_{f1}$ or the ratio having the value one, it is assumed that there was no signal mixing and thus no edge measurement, where random matches due to noise effects or particularly unfavorable phases are neglected, which theoretically still could occur.

In a phase method, more than two modulation frequencies $f_i$ can be used, and most of the above considerations are already formulated in general terms. However, a more general measure must then be found to evaluate the differences in amplitudes $a_{fi}$. Such a more general measure can of course also be applied to only two frequencies.

As an exemplary value for three frequencies and, in a completely analogous manner, more than three frequencies, the value $$w := \frac{std(a_{f0}, a_{f1}, a_{f2})}{mean(a_{f0}, a_{f1}, a_{f2})}$$

can be calculated, where mean is the arithmetic mean and std is the standard deviation. For similar amplitudes $a_{fi}$, the value w is small, and it vanishes for an ideal non-edge measurement, accordingly w increases for amplitude values $a_{fi}$ different from one another. There are other measure functions than w for evaluating whether the amplitude values $a_{fi}$ are similar enough or whether there is an edge measurement. Both for the value in the numerator another statistical measure for a spread such as "maximum minus minimum" and for the value in the denominator another statistical measure of reference such as the median could be used.

The respective extent of the deviation from a value for an ideal non-edge measurement, which is evaluated with one of the presented or another measure function, can be used as a quality or reliability criterion for the detection of an edge. Another conceivable criterion for reliability depends on the absolute value of the amplitudes. This is because the phase and amplitude measurement is less accurate at small absolute amplitudes, where deviations can be more likely due to noise.

It is possible to demand a certain reliability and thus to evaluate a measured value as an edge measurement or a non-edge measurement in a binary fashion. However, a graded or continuous reliability value, especially normalized to [0,1], can also be useful. This can for example be used to filter edge measurements by excluding measured values that too likely were edge measurements from further processing. On the other hand, it is also possible to consider edge measurements as measured values, but with less weight according to their reliability. In this way, potentially erroneous measured values have a weaker impact on the final result without being discarded completely.

Figure 5:
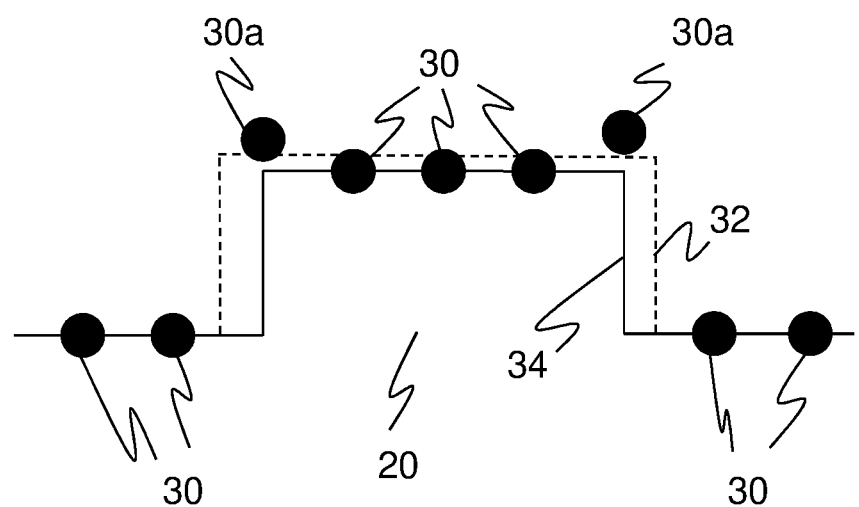
FIG. 5 a schematic representation of the measuring points of a laser scanner at object edges for comparative explanation of the measurement of the object with and without detection of edges.

FIG. 5 schematically shows some successively scanned measuring points 30 of a sensor 10, which for example is configured as a laser scanner. For each measuring point 30, the lateral position, for example as the angle from the encoder of the laser scanner, and the distance determined from the light time of flight using the phase method are known. During the scanning of object 20, the respective distances are measured, so that the contour and in particular the height and width of object 20 can be measured.

At the edges of the object, edge measurements occur, and therefore the measuring points 30a are subject to a systematic measuring error. Conventionally, the contour of object 20 would have been determined using the distance values, as shown with dotted line 32. The measuring points 30a are distorted by the edge, but not so much that they would be detected as being edge measurements for this reason alone. Therefore, they are conventionally included and cause the height and width of object 20 to be overestimated.

According to the invention, the edge measurements 30a are marked as edge measurements on the basis of their amplitudes by the method described above, regardless of the associated distance measurement value. Thus the angular position of object 20 is known without considering the measured distances. The distance values of the edge measurements 30a can be reconstructed from the vicinity, since the distances measured with the edge measurements 30a are not reliable. This results in the contour 34 shown with a solid line, which reproduces object 20 more accurately than conventionally. Accordingly, the height and width estimation of object 20 is also improved.

Up to now, it has been assumed that the modulation frequencies $f_i$ are artificial modulation frequencies independent of the carrier frequency of the transmitted light 16. Alternatively, it is conceivable to directly modulate the light field intensity and thus to operate on the carrier frequency itself. For this purpose, it is necessary that the light transmitter 12 provides at least two different light frequencies $f_i$. Instead of the conventional phase method described so far, phase and amplitude are now determined directly on the scales of the light frequency in a coherent measuring method, for example in an interferometric setup. The inherent unambiguity range in this case is determined by the very small light wavelength, but this can be compensated for by more frequencies $f_i$ or other means. The advantage is that the measurement accuracy can also reach the scale of light wavelengths.

According to the invention, edges or edge measurements are detected based on the amplitudes. Other or supplementary criteria are conceivable. The measurement at each frequency $f_i$ results in a respective phase and thus a distance $d_i$ with a small unambiguity range. In order to combine a common distance value from this, one usually tries to find integer combinations matching the measured distances $d_i$: Find d and m, $n \in N_0$, so that $d = d_0 + n \cdot \lambda_0 = d_1 + m \cdot \lambda_1$, where $\lambda_1$ and $\lambda_2$ are the wavelengths corresponding to the frequencies $f_0$ and $f_1$. In a modification, it is conceivable to try and find half-integer shifts, i.e. $m, n \in \{x + \frac{1}{2} | x \in N_0\}$. Should half-integer results fit better than integer results, this indicates that the measured phase values of $f_0$ and $f_1$ are not consistent with each other, which for example could be caused by an edge measurement. These edge measurements could be treated in an analogue way as described above, or this criterion can be used to decide once again whether they are edge measurements.

The invention claimed is:

1. An optoelectronic sensor (10) for determining the distance of an object (20) in a monitoring area (18), comprising:
   the sensor (10) having a light transmitter (12) for transmitting transmitted light;
   a light receiver (26) for generating a received signal from remitted light (22) remitted by the object (20); and
   a control and evaluation unit (28) configured to modulate the transmitted light (16) with at least a first frequency and a second frequency, to determine a phase offset between transmitted light (16) and remitted light (22) for the first frequency and the second frequency, and to determine a light time of flight from the phase offset between transmitted light and remitted light for the first frequency and the second frequency,
   wherein the control and evaluation unit (28) is furthermore configured to determine a first amplitude and a second amplitude for the first frequency and the second frequency from the received signal and to detect whether the transmitted light impinges on an edge in the monitoring area (18) on the basis of an evaluation of the first amplitude and the second amplitude,
   and wherein the control and evaluation unit (28) is configured to locate an object (20) in the monitoring area (18) means of a detected edge.

2. The sensor (10) according to claim 1,
   wherein the control and evaluation unit (28) is configured to evaluate at least one of a difference of the first amplitude and the second amplitude with a tolerance threshold and the ratio of the first amplitude and the second amplitude.

3. The sensor (10) according to claim 1,
   wherein the control and evaluation unit (28) is configured to evaluate a quotient of standard deviation and mean value of the amplitudes.

4. The sensor (10) according to claim 1,
   wherein the control and evaluation unit (28) is configured to determine a significance value for the detection of whether the transmitted light impinges on an edge in the monitoring area (18).

5. The sensor (10) according to claim 1,
   wherein the control and evaluation unit (28) is configured to discard distance values where the transmitted light impinges on an edge in the monitoring area (18).

6. The sensor (10) according to claim 1,
   wherein the control and evaluation unit (28) is configured to determine phase offsets and amplitudes in-phase and quadrature (IQ) demodulation.

7. The sensor (10) according to claim 1,
   wherein the control and evaluation unit (28) is configured to modulate with an artificial first frequency and second frequency independent of the carrier frequency of the transmitted light (16).

8. The sensor (10) according to claim 1,
   which is configured as a laser scanner having a movable deflection unit for periodically scanning the monitoring area (18) with the transmitted light (16) and an angle detection unit for determining the respective angular position of the deflection unit.

9. The sensor (10) according to claim 1, wherein the control and evaluation unit (28) is configured to output the distance values with additional information.

10. The sensor (10) according to claim 9, wherein the additional information is a binary edge flag or a significance value.

11. A method for determining the distance of an object (20) in a monitoring area (18), the method comprising:
    modulating transmitted light (16) with at least a first frequency and a second frequency prior to transmission into the monitoring area (18);
    receiving a signal generated from remitted light (22) remitted by the object (20),
    for the first frequency and the second frequency, determining a respective phase offset between transmitted light (16) and remitted light (22) and determining a light time of flight, from the phase offset between transmitted light and remitted light, for the first frequency and the second frequency;
    determining a first amplitude and a second amplitude for the first frequency and the second frequency from the received signal, and detecting whether the transmitted light impinges on an edge in the monitoring area (18) on the basis of an evaluation of the first amplitude and the second amplitude; and
    locating an object (20) in the monitoring area (18) by means of detected edge.

12. An optoelectronic sensor (10) for determining the distance of an object (20) in a monitoring area (18), comprising:
    the sensor (10) having a light transmitter (12) for transmitting transmitted light;
    a light receiver (26) for generating a received signal from remitted light (22) remitted by the object (20); and
    a control and evaluation unit (28) configured to modulate the transmitted light (16) with at least a first frequency and a second frequency, to determine a phase offset between transmitted light (16) and remitted light (22) for the first frequency and the second frequency, and to determine a light time of flight from the phase offset between transmitted light and remitted light for the first frequency and the second frequency,
    wherein the control and evaluation unit (28) is furthermore configured to determine a first amplitude and a second amplitude for the first frequency and the second frequency from the received signal and to detect whether the transmitted light impinges on an edge in the monitoring area (18) on the basis of an evaluation of the first amplitude and the second amplitude,
    wherein the control and evaluation unit (28) is configured to output the distance values with additional information,
    and wherein the additional information is a binary edge flag or a significance value.

* * * * *